United States Patent
Wang et al.

(10) Patent No.: US 10,428,164 B2
(45) Date of Patent: Oct. 1, 2019

(54) PRINTING MATERIAL FOR THREE-DIMENSIONAL PRINTING APPARATUS

(71) Applicants: XYZprinting, Inc., New Taipei (TW); Kinpo Electronics, Inc., New Taipei (TW)

(72) Inventors: Kuo-Hsiung Wang, New Taipei (TW); Chun-Wei Peng, New Taipei (TW)

(73) Assignees: XYZprinting, Inc., New Taipei (TW); Kinpo Electronics, Inc., New Taipei (TW)

(*) Notice: Subject to any disclaimer, the term of this patent is extended or adjusted under 35 U.S.C. 154(b) by 156 days.

(21) Appl. No.: 15/475,092

(22) Filed: Mar. 30, 2017

(65) Prior Publication Data
US 2018/0229441 A1    Aug. 16, 2018

(30) Foreign Application Priority Data
Feb. 16, 2017 (CN) ............ 2017 1 0083447

(51) Int. Cl.
| | |
|---|---|
| B29C 64/10 | (2017.01) |
| C08F 10/00 | (2006.01) |
| C08G 63/00 | (2006.01) |
| B29C 64/00 | (2017.01) |
| C08L 75/04 | (2006.01) |
| B29K 105/00 | (2006.01) |
| B29K 21/00 | (2006.01) |

(52) U.S. Cl.
CPC ............ *C08F 10/00* (2013.01); *B29C 64/00* (2017.08); *C08G 63/00* (2013.01); *C08L 75/04* (2013.01); *B29K 2021/003* (2013.01); *B29K 2105/258* (2013.01)

(58) Field of Classification Search
CPC .................. B29C 64/10; B29C 64/118
USPC .... 428/373, 357, 364, 374, 401, 402, 402.2, 428/402.24, 403, 407; 264/165, 171.1, 264/171.13, 172.11, 172.15, 638, 639
See application file for complete search history.

(56) References Cited

U.S. PATENT DOCUMENTS

| | | | | |
|---|---|---|---|---|
| 5,688,595 A | * | 11/1997 | Yamagishi | A63B 37/12 428/212 |
| 2018/0162048 A1 | * | 6/2018 | Gibson | B22F 3/1055 |

FOREIGN PATENT DOCUMENTS

CN    106189280 A  * 12/2016  ............ B29C 47/00

OTHER PUBLICATIONS

Shore (Durometer) Hardness Testing of Plastics, MatWeb, Material Property Data. (Year: 2015).*

(Continued)

*Primary Examiner* — Matthew D Matzek
(74) *Attorney, Agent, or Firm* — JCIPRNET

(57) ABSTRACT

A printing material for a three-dimensional (3D) printing apparatus is provided. The printing material includes a core and a shell covering the core, wherein the Shore hardness of the core is A45-A90, the Shore hardness of the shell is D40-D85, the Shore hardness of the shell is higher than the Shore hardness of the core, the volume percentage of the shell is 10% to 30%, and the volume percentage of the core is 70% to 90%. Since the printing material has a specific structure, feed abnormality during the printing material passing through a narrow inlet hole and guide tube may be prevented in the use of low-hardness material as the core.

5 Claims, 2 Drawing Sheets

(56) References Cited

OTHER PUBLICATIONS https://filaments.ca/blogs/3d-printing/15475957-shore-hardness-of-flexible-3d-printing-materials, accessed May 27, 2019. (Year: 2014).*

* cited by examiner

PRINTING MATERIAL FOR THREE-DIMENSIONAL PRINTING APPARATUS

CROSS-REFERENCE TO RELATED APPLICATION

This application claims the priority benefit of China application serial no. 201710083447.3, filed on Feb. 16, 2017. The entirety of the above-mentioned patent application is hereby incorporated by reference herein and made a part of this specification.

BACKGROUND OF THE INVENTION

Field of the Invention

The invention relates to a printing material, and more particularly, to a high-hardness shell covers a low-hardness core printing material for a three-dimensional (3D) printing apparatus.

Description of Related Art

Three-dimensional printing techniques have flourished in recent years and have attracted international attention, and are even often regarded as the third industrial revolution. As the application scope of 3D printing techniques is gradually increased, to meet market demand and produce objects of various materials via 3D printing techniques, more and more types of printing materials are adopted in 3D printing techniques, including various materials such as an acrylonitrile-butadiene-styrene block copolymer (ABS), polylactic acid (PLA), Nylon, polyethylene terephthalate (PET), and other elastic materials, and are being developed and introduced in the consumables market of 3D printing techniques.

In the current 3D printing apparatus, a printing wire material enters a guide tube through a narrow feed hole and transported to a coating system via a feeding device disposed on the outside of the 3D printing apparatus or a feeding device disposed on the inside of the 3D printing apparatus to soften the printing wire material for 3D printing. However, a gap is between the printing wire material and the feed hole regardless of whether an external feeding device or an internal feeding device is used, such that the printing wire material cannot enter and is stuck in the narrow feed hole after a period of feeding.

To prevent the issue of feed abnormality, the printing material used in current 3D printing techniques is limited to a material having greater hardness (rigid material), and therefore a material having smaller hardness has little potential in the material selection for printing a wire material.

SUMMARY OF THE INVENTION

Accordingly, the present invention is directed to a printing material in which a high-hardness shell covers a low-hardness core. Since the printing material provided by the invention has a specific structure, feed abnormality during the printing material passing through a narrow inlet hole and guide tube can be prevented in the use of a low-hardness printing material.

According to an embodiment of the invention, a printing material for a three-dimensional printing apparatus includes: a core and a shell covering the core, wherein the Shore hardness of the core is A45-A90, the Shore hardness of the shell is D40-D85, the Shore hardness of the shell is higher than the Shore hardness of the core, the volume percentage of the shell is 10% to 30%, and the volume percentage of the core is 70% to 90%.

According to an embodiment of the invention, the Shore hardness of the core is A60-A85.

According to an embodiment of the invention, the Shore hardness of the shell is D65-D85.

According to an embodiment of the invention, the core includes a thermoplastic elastomer including a polyether ester elastomer, a styrene-butadiene-styrene block copolymer, a styrene-ethylene/butylene-styrene block copolymer, a polyolefin elastomer, polyurethane, or a combination thereof.

According to an embodiment of the invention, the shell includes a thermoplastic elastomer including a polyether ester elastomer, a styrene-butadiene-styrene block copolymer, a styrene-ethylene/butylene-styrene block copolymer, a polyolefin elastomer, polyurethane, or a combination thereof.

According to an embodiment of the invention, the wire diameter of the printing material is from 1.7 mm to 3.1 mm.

Based on the above, in the printing material of the invention, a shell having high Shore hardness covers a core having low Shore hardness. Accordingly, when the printing material of the invention is transported to the coating system from the feeding device of the three-dimensional printing apparatus, the outside shell with high Shore hardness may prevent the inside core from deformation and bending, and thus it can avoid feed abnormality. A printing material containing a core having low Shore hardness can be smoothly transported and the drawback that a low-hardness printing material cannot be used in current three-dimensional printing techniques is solved.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
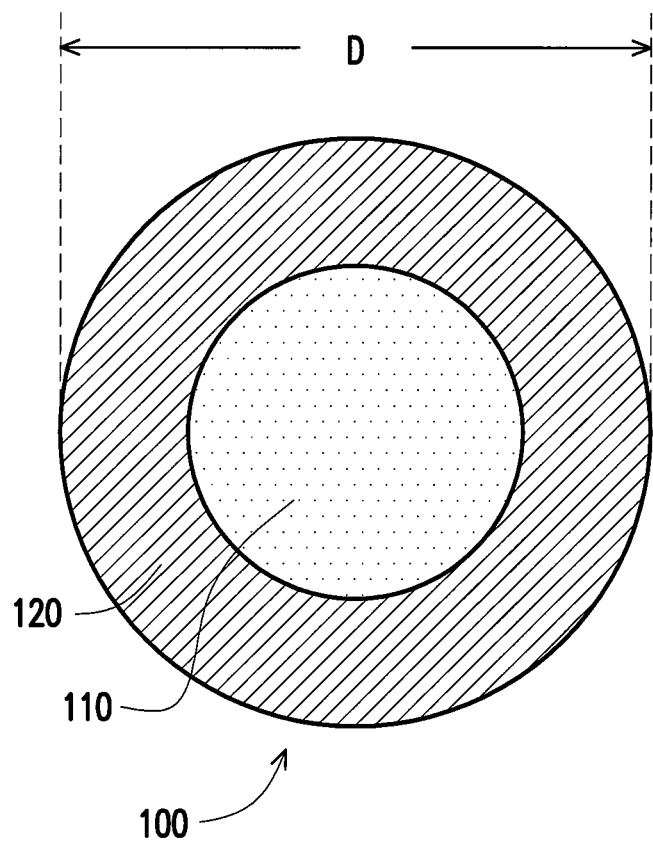
FIG. 1 is a cross-sectional diagram of a printing material of an embodiment of the invention.

The above and other technical content, features, and efficacies of the invention are clearly presented hereinafter in the detailed description of each embodiment of the figures. Terms indicating direction mentioned in the following embodiments such as "up", "down", "front", "back", "left", and "right" are only directions used in the figures. Therefore, the direction terms used are descriptive and are not intended to limit the invention. Moreover, in each embodiment below, the same or similar elements adopt the same or similar reference numerals.

Figure 2:
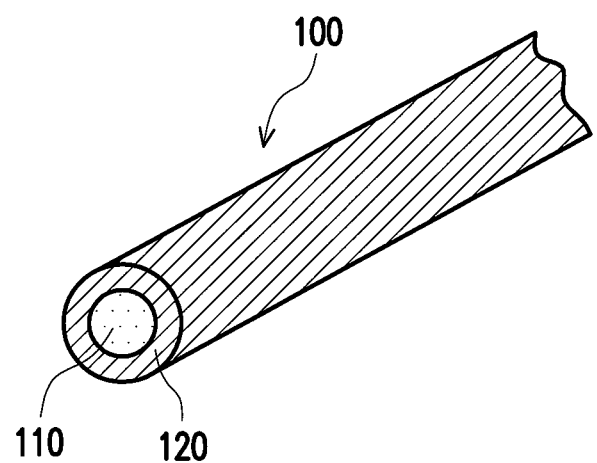
FIG. 2 is a three-dimensional diagram of a printing material of an embodiment of the invention.

FIG. 1 and FIG. 2 are respectively a cross-sectional diagram and a three-dimensional diagram of a printing material of an embodiment of the invention.

Referring to both FIG. 1 and FIG. 2, a printing material 100 of the present embodiment includes a core 110 and a shell 120. The core 110 and the shell 120 can be formed by, for instance, a coextrusion method, wherein the shell 120 covers the exterior of the core 110 to form a core-shell structure. In the present embodiment, the volume of the shell 120 in the entire printing material is less than the volume of the core 110 in the entire printing material. Specifically, the volume percentage of the shell 120 is 10% to 30%, and the volume percentage of the core 110 is 70% to 90%. For instance, the volume ratio of the shell 120 and the core 110 can be adjusted to 10:90, 15:85, 20:80, 25:75, or 30:70 as needed.

In the present embodiment, the Shore hardness of the shell 120 is higher than the Shore hardness of the core 110, wherein the Shore hardness of the shell 120 is D40-D85, and the Shore hardness of the core 110 is A45-A90. In one embodiments, the Shore hardness of the shell 120 can be adjusted to Shore hardness D45, Shore hardness D50, Shore hardness D55, Shore hardness D60, or Shore hardness D65, Shore hardness D75, or Shore hardness D80 based on actual printing requirements, wherein a Shore hardness of the shell 120 of D65-D80 can yield better printing results.

In other embodiments, based on actual printing requirements, the Shore hardness of the core 110 can be adjusted to Shore hardness A45, Shore hardness A50, Shore hardness A55, Shore hardness A60, Shore hardness A65, Shore hardness A70, Shore hardness A75, Shore hardness A80, or Shore hardness A85. When the Shore hardness of the core 110 is adjusted to be A60-A80, better printing results can be obtained.

The Shore hardness A90 is substantially equal to the Shore hardness D40. In other words, the Shore hardness of the shell 120 is greater than or equal to the Shore hardness D40, and the Shore hardness of the core 110 is less than or equal to the Shore hardness A90. That is, the Shore hardness of the shell 120 is greater than or equal to the Shore hardness of the core 110.

In actuality, the Shore hardnesses of the shell 120 and the core 110 can be adjusted according to the volume ratio of the shell 120 and the core 110. For instance, the smaller the total volume of the shell 120 is, then the harder the shell 120 has to be; the smaller the total volume of the core 110 is, then the softer the core 110 has to be.

For instance, Table 1 below shows the relationship between the volume percentage (%), hardness, and print results of the shell 120 and the core 110 in experimental example 1, comparative example 1, and comparative example 2:

TABLE 1

| | Volume percentage (%) of shell | Shell surface hardness | Volume percentage (%) of core | Core surface hardness | Print results |
|---|---|---|---|---|---|
| Comparative example 1 | 10 | Shore hardness D85 | 90 | Shore hardness A40 | Failure |
| Comparative example 2 | 20 | Shore hardness D85 | 80 | Shore hardness A40 | Failure |
| Experimental example 1 | 20 | Shore hardness D85 | 80 | Shore hardness A50 | Success |

It can be seen from Table 1 that, in comparative examples 1 and 2, when the hardness of the shell 120 is Shore hardness D85 and the hardness of the core 110 is Shore hardness A40, even if the volume percentage of the shell is increased from 10% to 20%, printing still fails. In experimental example 1, when the hardness of the shell 120 is Shore hardness D85 and the volume percentage of the shell 120 is 20%, a Shore hardness A50 for the hardness of the core 110 is sufficient for successful printing.

The material selection of the shell 120 and the core 110 can adopt a thermoplastic elastomer. The term "thermoplastic elastomer" refers to a polymer material having the properties of vulcanized rubber at room temperature (i.e., properties of elastomer) that is capable of plastic deformation at high temperature. The thermoplastic elastomer has characteristics such as a glass-transition temperature less than room temperature, an elongation at break of >50%, and good recovery after withdrawal of external force.

Thermoplatic elastomers include many types, and the classification generally divids into several major groups based on differences of the molecular structure of the main chain having the greatest impact, and therefore thermoplatic elastomers can substantially be classified into thermoplastic polyurethane, polyolefin elastomer, dynamically vulcanized polyolefin elastomer, polystyrene elastomer, polyether ester elastomer, and polyamide elastomer. The surface hardnesses of these thermoplatic elastomers also cover a very wide range due to different types, and can range from, for instance, Shore hardness A45 to Shore hardness D80, and therefore the application range is also very broad. In particular, the hardness range of Shore hardness A80 to A95 overlapps with Shore hardness D30 to D50, i.e., the surface hardnesses are the same, but the hardness units are presented differently.

Due to the flexible property of the thermoplastic elastomer, if used as a printing material, then the thermoplastic elastomer is readily deformed and bent during three-deimnsional printing, such that the thermoplastic elastomer cannot be fed, and as a result the printed object is abnormal or cannot be successfully printed. Therefore, only the printing material having Shore hardness A90 or more (equivalent to Shore hardness D40) could previously be used to provide sufficient stiffness and surface hardness to prevent printing issues.

In the printing material of the invention, the shell 120 having high Shore hardness covers the core 110 having low Shore hardness, and therefore the feed abnormality issue caused by the bending of the thermoplastic elastomer during printing can be alleviated, and a thermoplastic elastomer having low hardness can be used as the core 110, such as a more flexible thermoplastic elastomer having a hardness of Shore hardness A45 to A80. In the present embodiment, the material of the core 110 is, for instance, selected from a thermoplastic elastomer including a polyether ester elastomer (TPEE), a styrene-butadiene-styrene block copolymer (SBS), a styrene-ethylene/butylene-styrene block copolymer (SEBS), a polyolefin elastomer (TPO), polyurethane (PU), or a combination thereof. The material of the shell 120 is, for instance, selected from a thermoplastic elastomer including a polyether ester elastomer (TPEE), a styrene-butadiene-styrene block copolymer (SBS), a styrene-ethylene/butylene-styrene block copolymer (SEBS), a polyolefin elastomer (TPO), polyurethane (PU), or a combination thereof. All of the above materials are thermoplastic elastomer materials.

The Shore hardness of the thermoplastic elastomer is changed by properties such as molecular weight and degree of polymerization, and any material for the shell 120 and the core 110 of the invention is within the concept and scope of the invention provided the Shore hardness of the shell 120 is higher than the Shore hardness of the core 110, and the shell 120 and the core 110 are not limited to same or different types of thermoplastic elastomers. In the present embodiment, the material of the shell 120 and the material of the core 110 are preferably the same type of thermoplastic elastomers having different surface hardnesses.

In some embodiments, the cores 110 having different functions such as color, conductivity, and magnetism can be added or replaced, such that the printing material 100 can have different functional properties. In some embodiments of the invention, a printing material 100 having different functional properties can be obtained by doping different functional particles in the core 110, wherein the functional particles can be particles having properties such as color, conductivity, or magnetism.

The printing material 100 is a strip material having a wire diameter D, wherein the wire diameter D is, for instance, from 1.7 mm to 3.1 mm. However, the invention is not limited thereto, and in actuality, the wire diameter D of the printing material 100 can be adjusted based on the requirements of the printing apapratus, such as adjusted to 1.71-1.79 mm or 2.96-3.04 mm mm.

In FIG. 1 and FIG. 2, the cross-sections of the core 110 and the shell 120 are shown as concentric circles, but FIG. 1 and FIG. 2 are only exemplary, and the core 110 and the shell 120 of the invention are not limited to concentric circles. The center of the cross-section of the core 110 can also deviate from the center of the cross-section of the shell 120. Moreover, in other embodiments, the cross-section(s) of the core 110 and/or the shell 120 can also be oval, trianglar, quadranglar, or other geometric shapes, and the cross-sections of the core 110 and the shell 120 can have the same or different geometric shapes.

Based on the above, in the printing material of the invention, a shell having high Shore hardness covers a core having low Shore hardness, and therefore when the printing material of the invention is transported from the feeding device of the three-dimensional printing apparatus to the coating system, the outside shell prevents the inside core from deformation and bending, and thus the feed abnormality can be avoided, such that the printing material containing a core with low Shore hardness can be successfully transported. As a result, the drawback that current three-dimensional printing techniques cannot adopt a low hardness printing material is solved.

Although the disclosure has been provided with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A printing material for a three-dimensional printing apparatus, comprising:
    a wire comprising a core and a shell;
    wherein a Shore hardness of the core is A45-A90;
    the shell covers the core, wherein a Shore hardness of the shell is D40-D85, and the Shore hardness of the shell is higher than the Shore hardness of the core;
    a volume percentage of the shell is 10% to 30%, and a volume percentage of the core is 70% to 90%,
    wherein the wire has a diameter of 1.7 mm to 3.1 mm.

2. The printing material of claim 1, wherein the Shore hardness of the core is A60-A85.

3. The printing material of claim 1, wherein the Shore hardness of the shell is D65-D80.

4. The printing material of claim 1, wherein the core comprises a thermoplastic elastomer comprising a polyether ester elastomer, a styrene-butadiene-styrene block copolymer, a styrene-ethylene/butylene-styrene block copolymer, a polyolefin elastomer, polyurethane, or a combination thereof.

5. The printing material of claim 1, wherein the shell comprises a thermoplastic elastomer comprising a polyether ester elastomer, a styrene-butadiene-styrene block copolymer, a styrene-ethylene/butylene-styrene block copolymer, a polyolefin elastomer, polyurethane, or a combination thereof.

\* \* \* \* \*